(12) United States Patent
Nakajima et al.

(10) Patent No.: US 11,330,142 B2
(45) Date of Patent: May 10, 2022

(54) SERVICE PROVIDING SYSTEM, CONTROL METHOD OF SERVICE PROVIDING SYSTEM, AND INFORMATION PROCESSING APPARATUS

(71) Applicant: SEIKO EPSON CORPORATION, Tokyo (JP)

(72) Inventors: Norihiko Nakajima, Matsumoto (JP); Diego Albergoni, Watford (GB); Mauro Bartoletti, Milan (IT); Alberto Raviolo, Brugherio (IT)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/081,791

(22) Filed: Oct. 27, 2020

(65) Prior Publication Data

US 2021/0127030 A1    Apr. 29, 2021

(30) Foreign Application Priority Data

Oct. 28, 2019 (JP) .............................. JP2019-195557

(51) Int. Cl.
*H04N 1/32* (2006.01)
*G06F 3/12* (2006.01)
*H04N 1/34* (2006.01)

(52) U.S. Cl.
CPC ......... *H04N 1/32096* (2013.01); *G06F 3/121* (2013.01); *G06F 3/1231* (2013.01); *H04N 1/344* (2013.01); *H04N 1/346* (2013.01)

(58) Field of Classification Search
None
See application file for complete search history.

(56) References Cited

U.S. PATENT DOCUMENTS

| | | |
|---|---|---|
| 2006/0045595 A1 | 3/2006 | Hanaoka |
| 2008/0288363 A1 | 11/2008 | Ueno et al. |
| 2017/0178225 A1 | 6/2017 | Suzuki et al. |
| 2018/0176413 A1 | 6/2018 | Nagasaki |
| 2018/0239568 A1 | 8/2018 | Tomioka |

FOREIGN PATENT DOCUMENTS

| | | |
|---|---|---|
| EP | 1541365 | 6/2005 |
| EP | 3182689 | 6/2017 |
| EP | 3343345 | 7/2018 |
| JP | 2018-136638 A | 8/2018 |

*Primary Examiner* — Lennin R Rodriguezgonzalez
(74) *Attorney, Agent, or Firm* — Workman Nydegger

(57) ABSTRACT

Provided is a service providing system including: a service providing server providing a printer use service; and a user terminal configured to communicate with the service providing server, in which the user terminal receives an input of a card number recorded in a service card for receiving the printer use service and transmits the received card number to the service providing server, and the service providing server performs authentication processing of the service card based on the card number received from the user terminal and performs printer delivery processing of causing a service printer to be delivered when authentication of the service card in the authentication processing is successful.

9 Claims, 10 Drawing Sheets

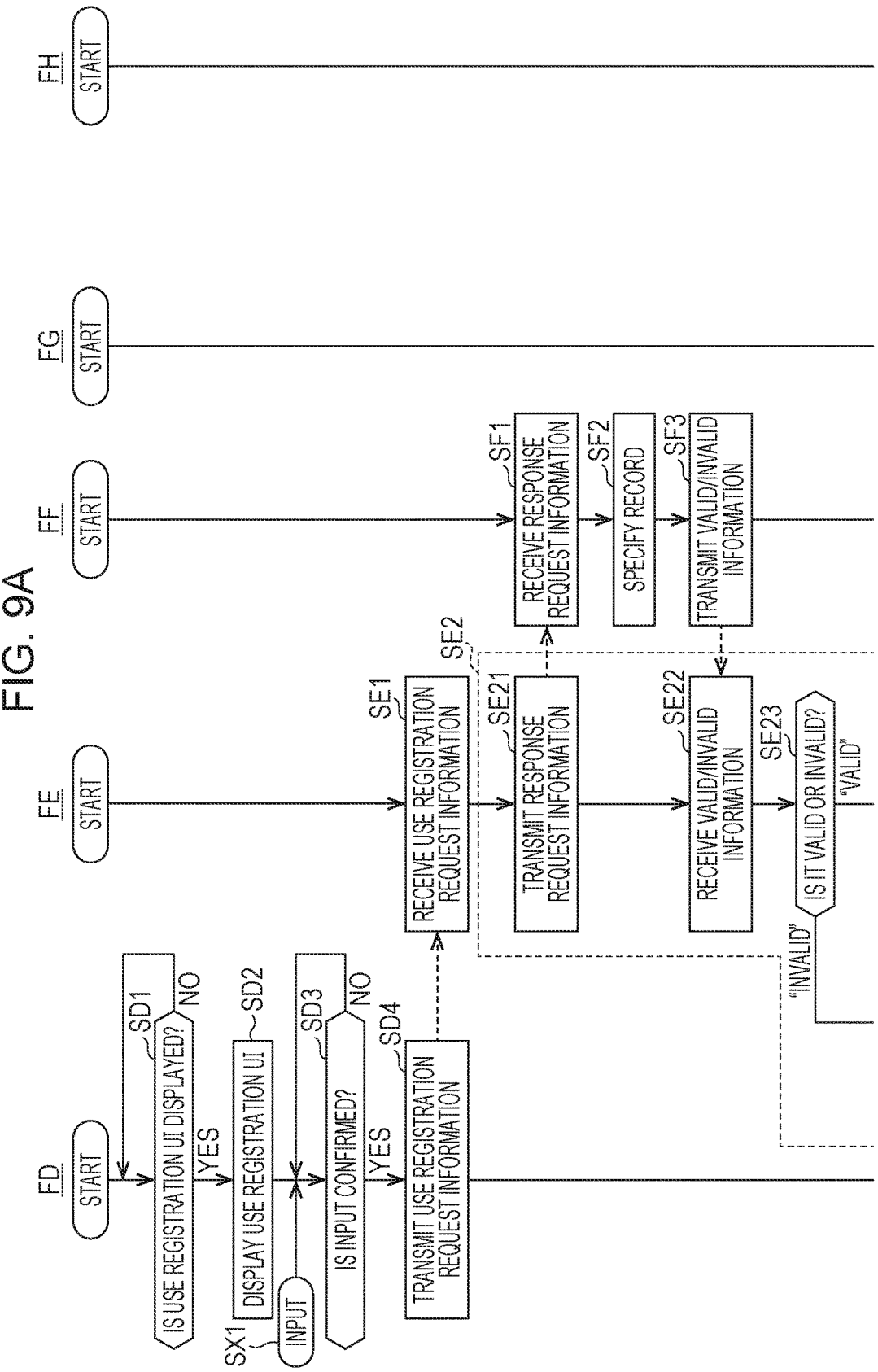

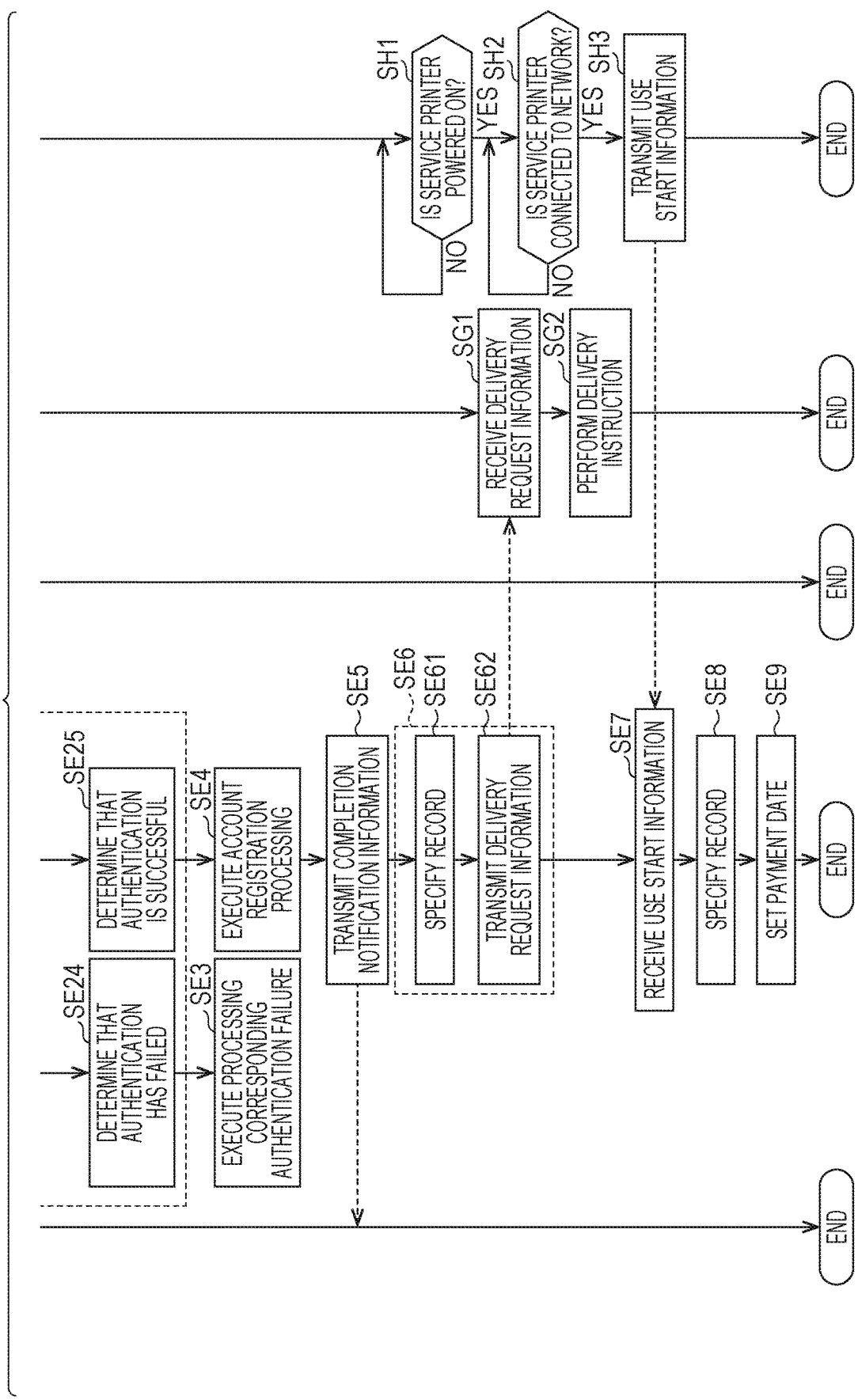

SERVICE PROVIDING SYSTEM, CONTROL METHOD OF SERVICE PROVIDING SYSTEM, AND INFORMATION PROCESSING APPARATUS

The present application is based on, and claims priority from JP Application Serial Number 2019-195557, filed Oct. 28, 2019, the disclosure of which is hereby incorporated by reference herein in its entirety.

BACKGROUND

1. Technical Field

The present disclosure relates to a service providing system, a control method of a service providing system, and an information processing apparatus.

2. Related Art

In the related art, a service related to a use of a printer is known. For example, JP-A-2018-136638 discloses a service for ordering a consumable item for a multifunction machine to a purchaser that is a purchase destination of the consumable item for the multifunction machine.

However, the services in the related art include a service for delivering a consumable item as described in JP-A-2018-136638, but does not include a service including delivery of a printer. Therefore, in the related art, in order for a user to receive a service related to a use of a printer, it is necessary to select a printer to be used for the service from various printers, or to take the purchased printer home from a store, which is inconvenient.

SUMMARY

According to an aspect of the present disclosure, there is provided a service providing system including: a first information processing apparatus providing a service related to a use of a printer; and a first terminal apparatus configured to communicate with the first information processing apparatus, in which the first terminal apparatus receives an input of card information recorded in a card for receiving the service and transmits the received card information to the first information processing apparatus, and the first information processing apparatus performs authentication processing of the card based on the card information received from the first terminal apparatus and performs first delivery processing of causing the printer used in the service to be delivered when authentication of the card in the authentication processing is successful.

In the service providing system, the first terminal apparatus may receive an input of delivery destination information indicating a delivery destination of the printer and transmit the received delivery destination information to the first information processing apparatus, and the first information processing apparatus may cause the printer to be delivered to the delivery destination indicated by the delivery destination information received from the first terminal apparatus in the first delivery processing.

In the service providing system, the service may include delivery of a consumable item for the printer, and the first information processing apparatus may receive consumable item-related information related to the consumable item from the printer delivered in the first delivery processing, determine whether the consumable item needs to be delivered based on the received consumable item-related information, and perform second delivery processing of causing the consumable item to be delivered when it is determined that the consumable item needs to be delivered.

In the service providing system, a second terminal apparatus performing accounting processing of the card; and a second information processing apparatus configured to communicate with the second terminal apparatus and validate or invalidate a use of the card may be further included, the second terminal apparatus may transmit the card information recorded in the card subjected to the accounting processing to the second information processing apparatus, the second information processing apparatus may receive the card information from the second terminal apparatus and validate the use of the card in which the received card information is recorded, and when the use of the card in which the card information received from the first terminal apparatus is recorded is valid, the first information processing apparatus may determine that the authentication of the card in the authentication processing is successful.

In the service providing system, the second terminal apparatus may transmit payment information of the card generated in the accounting processing of the card to the second information processing apparatus in association with the card information, and the second information processing apparatus may validate the use of the card in which the received card information is recorded when the payment information is associated with the received card information.

According to another aspect of the present disclosure, there is provided a control method of a service providing system including: a first information processing apparatus providing a service related to a use of a printer, and a first terminal apparatus configured to communicate with the first information processing apparatus, the method including: receiving an input of card information recorded in a card for receiving the service, and transmitting the received card information to the first information processing apparatus, by the first terminal apparatus; and performing authentication processing of the card based on the card information received from the first terminal apparatus and performing first delivery processing of causing the printer used in the service to be delivered when authentication of the card in the authentication processing is successful, by the first information processing apparatus.

According to still another aspect of the present disclosure, there is provided an information processing apparatus that provides a service related to a use of a printer, the apparatus including: a receiving section that receives card information recorded in a card for receiving the service from a terminal apparatus; and a control section that performs authentication processing of the card based on the card information received by the receiving section from the terminal apparatus and performs first delivery processing of causing the printer used in the service to be delivered when authentication of the card in the authentication processing is successful.

BRIEF DESCRIPTION OF THE DRAWINGS

FIG. 9A is a first half of a flowchart illustrating an operation of a service providing system.

FIG. 9B is a second half of the flowchart illustrating the operation of the service providing system.

DESCRIPTION OF EXEMPLARY EMBODIMENTS

Figure 1:
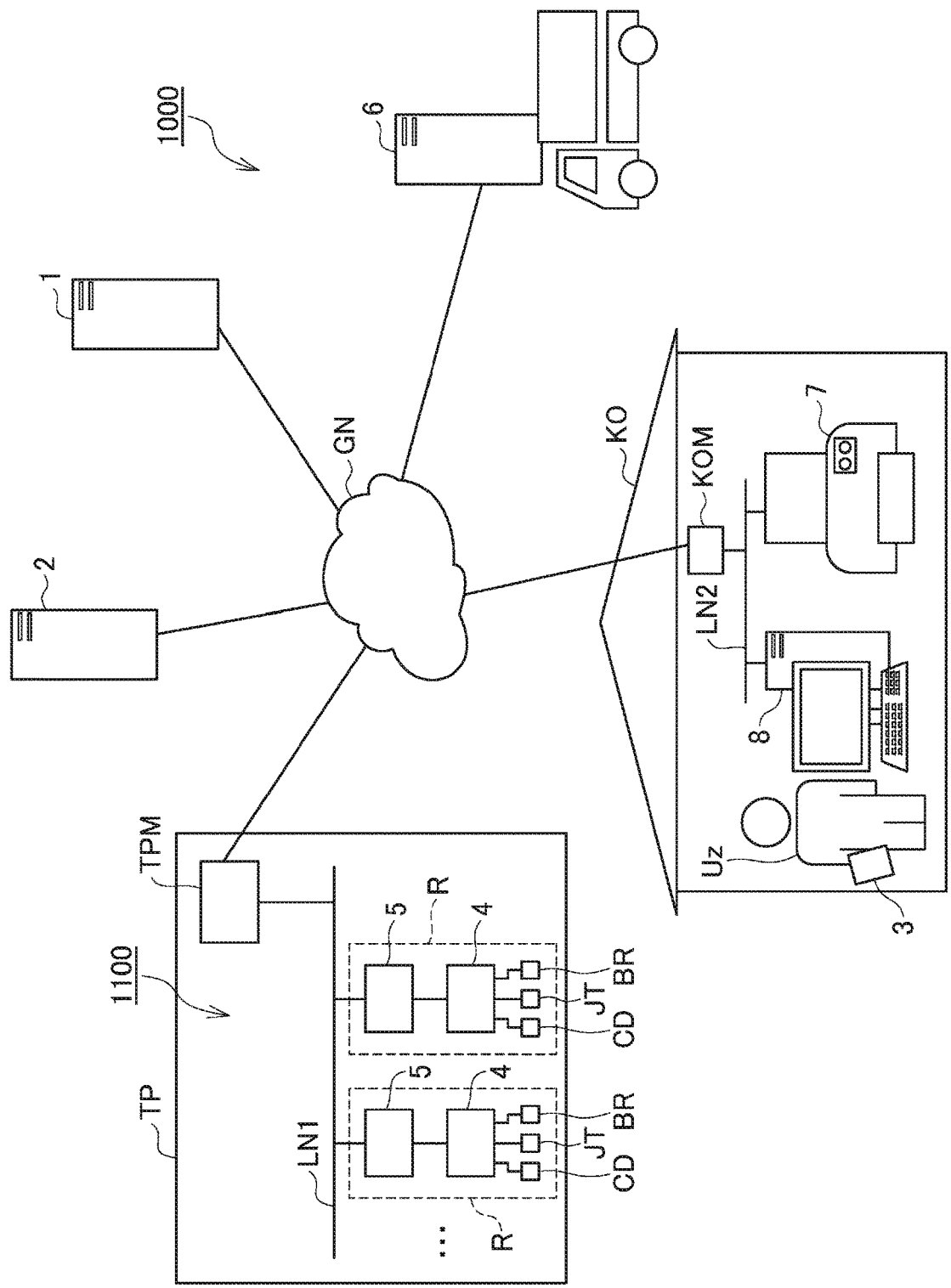
FIG. 1 is a diagram illustrating a configuration of a service providing system.

FIG. 1 is a diagram illustrating a configuration of a service providing system 1000.

The service providing system 1000 is a system that provides services related to a use of a printer. In the following description, the service related to the use of the printer is referred to as a "printer use service". The printer use service is a service in which a user pays for the use of the printer for a fixed period, and is a so-called subscription type service.

The service providing system 1000 includes a service providing server 1. The service providing server 1 corresponds to an example of a first information processing apparatus and an information processing apparatus. The service providing server 1 is a server apparatus that provides a printer use service. The service providing server 1 is connected to a global network GN including the Internet, a telephone network, and other communication networks, to communicate with devices connected to the global network GN. The service providing server 1 is owned by, for example, a company that operates a printer use service.

Although the service providing server 1 is represented by one block in each drawing, this does not necessarily mean that the service providing server 1 is configured by a single server apparatus. For example, the service providing server 1 may include a plurality of server apparatuses having different processing contents.

The service providing system 1000 includes a card management server 2. The card management server 2 corresponds to an example of a second information processing apparatus. The card management server 2 is a server apparatus that, with respect to a card for receiving a printer use service, manages validity/invalidity of the use of the card. In the following description, the card for receiving the printer use service is referred to as a "service card" and a symbol "3" is given. The service card 3 is a so-called prepaid card. The card management server 2 is owned by, for example, a company that is entrusted with a management of a service card 3 by a company that operates a printer use service. The card management server 2 manages the validity/invalidity of the use of the issued service card 3. Examples of entities that issue the service card 3 include a company that manages the service card 3 and a company that operates a printer use service. The card management server 2 is connected to the global network GN and communicates with the devices connected to the global network GN.

Although the card management server 2 is represented by one block in each drawing, it does not mean that the card management server 2 is configured by a single server apparatus like the service providing server 1.

The service providing system 1000 includes one or a plurality of store systems 1100. FIG. 1 exemplifies a case where the service providing system 1000 includes one store system 1100.

The store system 1100 is a system used for a store TP such as a supermarket, a convenience store, and a department store. The store TP may be a facility in which products are provided and payment is made by a customer according to the provision of the product. In the present embodiment, "product" means not only a product delivered to the customer as an object, but also a service provided to the customer, food and drink provided to the customer, and the like, which are provided to the customer in exchange for consideration. In addition, in the present embodiment, the products provided by the store TP include a service card 3. The store system 1100 has a function of performing accounting according to the customer's purchase of the product, a function of issuing a receipt according to the accounting, and the like.

The store TP to which the store system 1100 is applied is provided with a register counter R where the customer performs accounting. Although FIG. 1 illustrates a case where a plurality of register counters R are provided in one store TP, one register counter R may be provided in one store TP. The register counter R is provided with a receipt printer 4 having a function of printing on roll paper, which is a form of a print medium. Further, the register counter R is provided with a POS terminal 5 that is communicably connected to the receipt printer 4 and controls the receipt printer 4. The POS terminal 5 corresponds to an example of a second terminal apparatus.

At the time of accounting at the register counter R, a person in charge of a cash register reads a barcode attached to a product or a package of the product with a barcode reader BR connected to the receipt printer 4, or inputs to the POS terminal 5 for accounting. The receipt printer 4 outputs the read data read by the barcode reader BR to the POS terminal 5. The POS terminal 5 controls the receipt printer 4 to cause the receipt printer 4 to issue a receipt based on the read data read by the barcode reader BR and input from the receipt printer 4 or the input corresponding to the accounting by the person in charge of the cash register. The receipt issued by the receipt printer 4 is delivered to the customer by the person in charge of the cash register.

The store system 1100 includes a local network LN1.

The POS terminal 5 and a store communication apparatus TPM are connected to the local network LN1. The store communication apparatus TPM is an interface apparatus that connects the local network LN1 to the global network GN. The store communication apparatus TPM has a function related to a modem or an optical network unit (ONU), a router function, a network address translation (NAT) function, a dynamic host configuration protocol (DHCP) server function, and the like. The store communication apparatus TPM transfers data transmitted/received between devices, in communication performed between a device connected to the local network LN1 and a device connected to the global network GN. Although the store communication apparatus TPM is represented by one block in FIG. 1, the store communication apparatus TPM may have a configuration having a plurality of apparatuses according to the function. The POS terminal 5 can access the global network GN via the store communication apparatus TPM.

The service providing system 1000 includes a delivery server 6. The delivery server 6 is a server apparatus that instructs a delivery person to deliver a delivery object. The delivery server 6 is, for example, owned by a company that is entrusted with a delivery work by a company that operates a printer use service, and gives a delivery instruction to a delivery person who is an employee of the company. The delivery server 6 is connected to the global network GN and communicates with devices connected to the global network GN. In the present embodiment, the delivery objects delivered by the delivery instruction from the delivery server 6 are a service printer 7, which is a printer to be used in the printer use service, and a consumable item for the service printer 7. In the present embodiment, ink is exemplified as a consumable item for the service printer 7. The service printer 7 delivered by the delivery instruction from the delivery server 6 is owned by the company that operates the printer use service. The service printer 7 corresponds to an example of a printer.

The service providing system 1000 includes one or a plurality of service printers 7. FIG. 1 exemplifies a case where the service providing system 1000 includes one service printer 7. Further, a case where the service printer 7 is delivered to a house KO according to the delivery instruction from the delivery server 6 is illustrated in FIG. 1. The service printer 7 is a continuous ink supply system (CISS) type printer in which an ex-post filling of ink into an ink tank that supplies ink to an ink jet head is possible. The service printer 7 delivered to the house KO is connected to a local network LN2 laid in the house KO and communicates with a device connected to the global network GN via a house communication apparatus KOM connected to the local network LN2. The service printer 7 connected to the local network LN2 communicates with a user terminal 8 connected to the local network LN2. The user terminal 8 corresponds to an example of a first terminal apparatus and a terminal apparatus.

The house communication apparatus KOM is an interface apparatus that connects the local network LN2 to the global network GN. The house communication apparatus KOM has the same function as the store communication apparatus TPM. The house communication apparatus KOM transfers data transmitted/received between devices, in communication performed between a device connected to the local network LN2 and a device connected to the global network GN.

Although the house communication apparatus KOM is represented by one block in FIG. 1, the house communication apparatus KOM may have a configuration having a plurality of apparatuses according to the function.

The service providing system 1000 includes one or a plurality of user terminals 8. The user terminal 8 is a terminal apparatus owned by a user Uz. The desktop type computer is exemplified as a user terminal 8 in FIG. 1, but the user terminal 8 may be a laptop type computer or a tablet type computer. The user terminal 8 is connected to the local network LN2, and communicates with the service printer 7 connected to the local network LN2 and a device connected to the global network GN.

When the user terminal 8 can be connected to the global network GN without passing through the local network LN2, the user terminal 8 may communicate with a device connected to the global network GN without passing through the local network LN2. Further, the user terminal 8 may communicate with the service printer 7 by a one-to-one communication method. Examples of the communication method include a direct communication method in which wireless communication is performed not through an access point such as Wi-Fi Direct. Wi-Fi is a registered trademark.

Next, a functional configuration of each apparatus of the service providing system 1000 will be described.

First, functional configurations of a service providing server 1, a card management server 2, and a delivery server 6 will be described.

Figure 2:
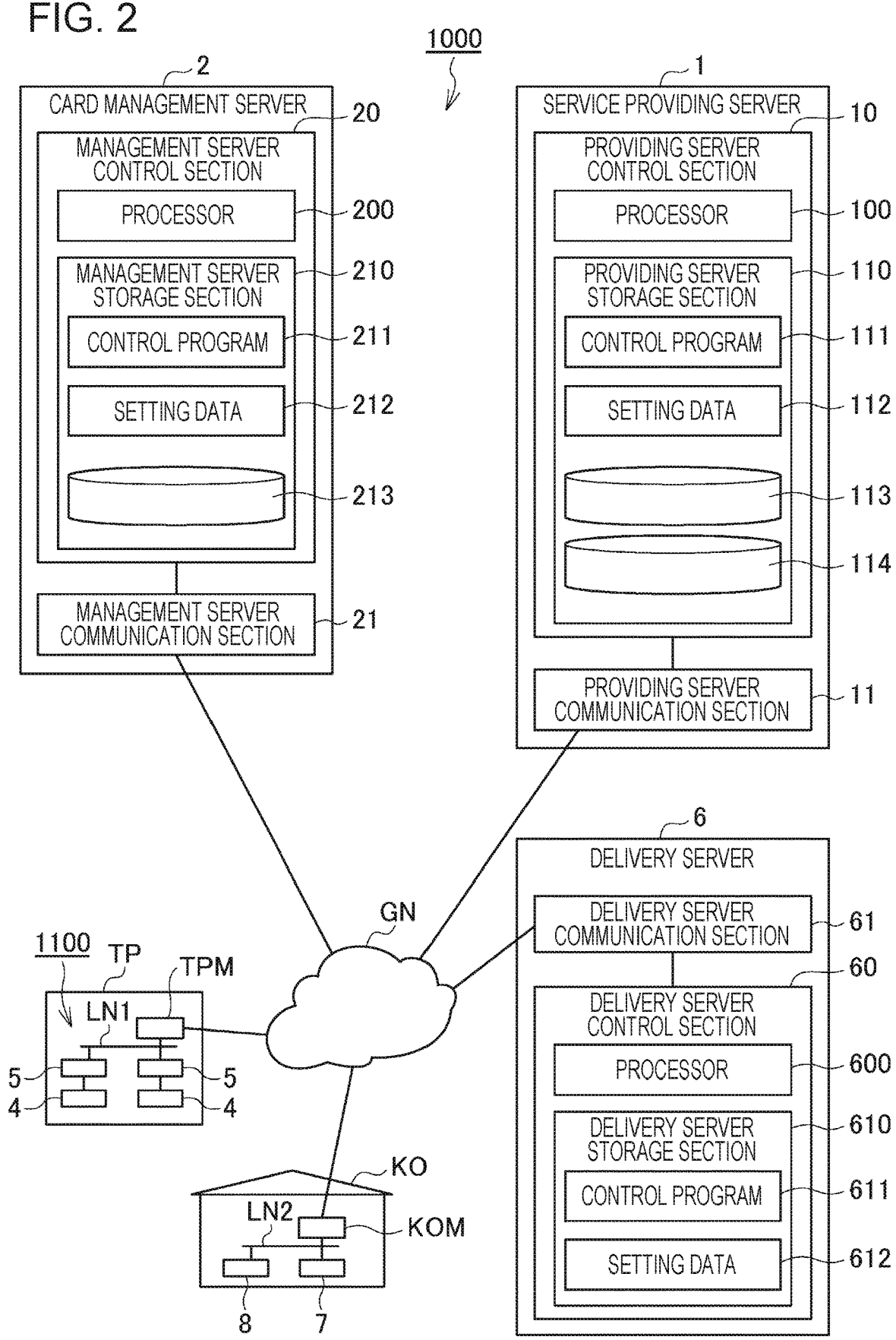
FIG. 2 is a block diagram of each server.

FIG. 2 is a block diagram illustrating the functional configurations of the service providing server 1, the card management server 2, and the delivery server 6. Note that, a case where the service printer 7 is delivered to the house KO according to the delivery instruction from the delivery server 6 is illustrated in FIG. 2.

The service providing server 1 includes a providing server control section 10. The providing server control section 10 corresponds to an example of a control section.

The providing server control section 10 includes a processor 100 that executes programs of a CPU or an MPU, and a providing server storage section 110, and controls each section of the service providing server 1. The providing server control section 10 executes various kinds of processing by cooperation of hardware and software so that the processor 100 reads a control program 111 stored in the providing server storage section 110 and executes processing.

The providing server storage section 110 has a storage area for storing a program executed by the processor 100 or data processed by the processor 100. The providing server storage section 110 stores a control program 111 executed by the processor 100 and setting data 112 including various setting values related to an operation of the service providing server 1. The providing server storage section 110 has a non-volatile storage area for storing programs or data in a non-volatile manner. Further, the providing server storage section 110 may include a volatile storage area and may be configured to temporarily store a program executed by the processor 100 or data to be processed.

The providing server storage section 110 stores an account management database 113 and a printer management database 114 in addition to the control program 111 and the setting data 112.

First, the account management database 113 will be described.

The account management database 113 is a database for managing an account given to a user of the printer use service provided by the service providing server 1. Note that, the users referred to here may include an entity such as a company other than a person.

Figure 3:
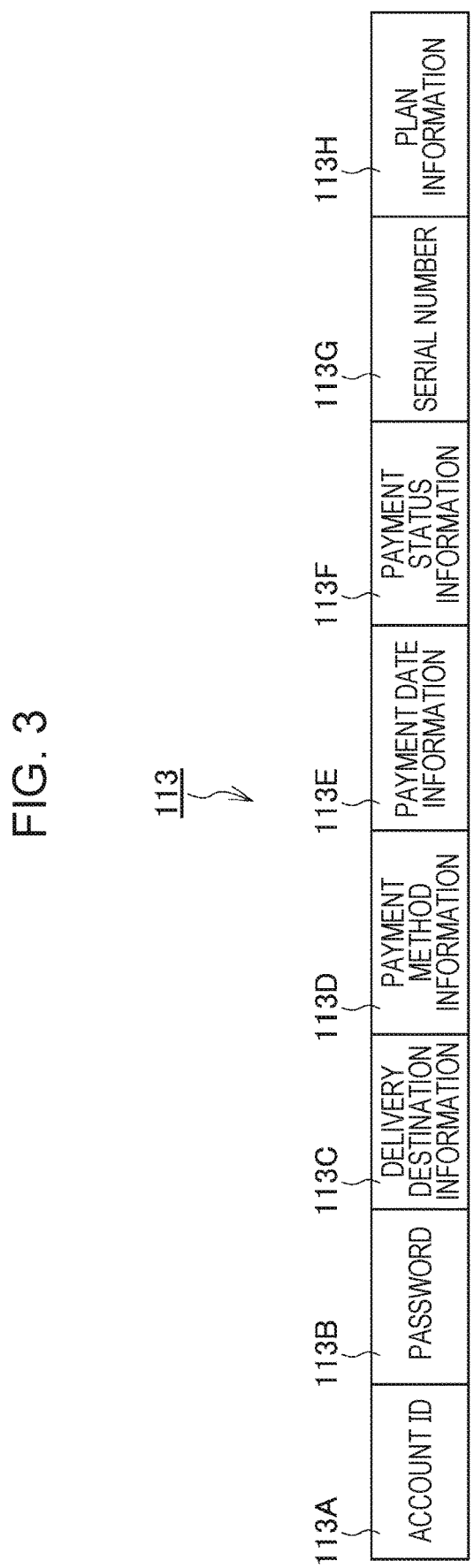
FIG. 3 is a diagram illustrating an example of an account management database.

FIG. 3 is a diagram schematically illustrating information included in one record of the account management database 113.

As illustrated in FIG. 3, one record of the account management database 113 includes an account ID 113A, a password 113B, delivery destination information 113C, payment method information 113D, payment date information 113E, payment status information 113F, a serial number 113G, and plan information 113H.

The account ID 113A is identification information for identifying an account given to a user of the printer use service. For example, when a user Uz performs a use registration for the printer use service, the account ID 113A is automatically assigned to the account given to the user Uz.

The password 113B is authentication information for authenticating an account when using the account. For example, when the user Uz performs a use registration for the printer use service, the password 113B is set by the user Uz.

The delivery destination information 113C is information indicating a delivery destination of the service printer 7 and the consumable item for the service printer 7. For example, the delivery destination information 113C is set by the user Uz when the user Uz performs a use registration for the printer use service. The delivery destination information 113C may be changed even after the delivery destination information 113C is stored in the account management database 113, that is, after the use registration of the printer use service.

The payment method information 113D is information indicating a payment method of the price for using the printer use service. For example, when the payment method information 113D indicates a payment method by a credit card, the payment method information 113D includes a combination of information indicating that the payment method is a credit card and a credit card number. For example, the payment method information 113D is set by the user Uz when the user Uz performs the use registration for the printer use service. The payment method information 113D may be changed even after the use registration for the printer use service is performed, like the delivery destination information 113C.

The payment date information 113E is information indicating a payment date of the price for using the printer use service. Since the printer use service is a subscription type service, the payment date indicated by the payment date information 113E is indicated, for example, in a form of "what day of every month". For example, the payment date information 113E indicates a payment date in the form of "what day of every month", starting from the date when the use of the service printer 7 is started.

The payment status information 113F is information indicating a payment status of the price for using the printer use service. The payment status information 113F is information indicating whether the payment status corresponds to paid or not paid. On the payment date indicated by the payment date information 113E, the providing server control section 10 inquires of a payment agency company to acquire a payment status from the company, and updates the payment status information 113F as appropriate.

The serial number 113G is an identification number for identifying the service printer 7.

The plan information 113H is information indicating a plan of the printer use service. The plan indicated by the plan information 113H is selected by the user Uz, for example, when the user Uz performs the use registration for the printer use service. In the present embodiment, the printer use service plan includes a plan that does not have an upper limit on the printed sheet number of print media that can be printed in a fixed period, and a plan that has an upper limit on the printed sheet number of print media that can be printed in a fixed period. The plan with an upper limit may have a plurality of plans with different charges for a fixed period depending on the number of printed sheets.

Next, the printer management database 114 will be described.

The printer management database 114 is a database for managing the service printer 7.

Figure 4:
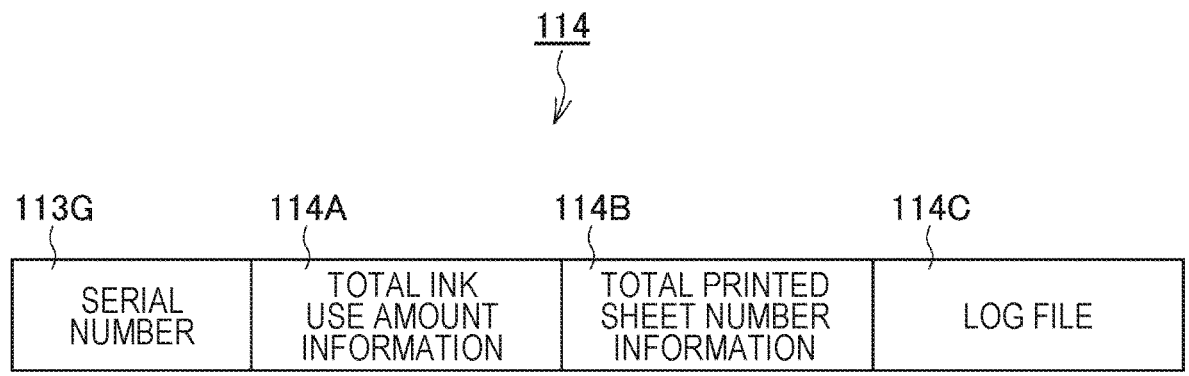
FIG. 4 is a diagram illustrating an example of a printer management database.

FIG. 4 is a diagram schematically illustrating information included in one record of the printer management database 114.

As illustrated in FIG. 4, the one record of the printer management database 114 has a serial number 113G, total ink use amount information 114A, total printed sheet number information 114B, and a log file 114C. The total ink use amount information 114A corresponds to an example of consumable item-related information.

The total ink use amount information 114A is information indicating the total amount of ink used after the service printer 7 is delivered. In the following description, the total amount of ink used after the service printer 7 is delivered is referred to as "total ink use amount". The total ink use amount indicated by the total ink use amount information 114A is appropriately updated by the providing server control section 10.

The total printed sheet number information 114B is information indicating the total number of print media printed by the service printer 7 in a fixed period. The total printed sheet number information 114B is updated as appropriate by the providing server control section 10. Further, the total number of print media indicated by the total printed sheet number information 114B is reset to 0 when the price is paid on the payment date indicated by the payment date information 113E.

The log file 114C refers to a file in which log information is described. The log information refers to a log of a plurality of monitoring items. The monitoring item refers to an item in which it is determined in advance that the state of the service printer 7 is monitored and a log is taken. For example, as a monitoring item, there is a monitoring item of a printer error. As a printer error log which is a monitoring item, information indicating that a printer error has occurred is recorded, in the log file 114C in time series together with information indicating the date and time. The printer error refers to a state in which normal printing cannot be performed due to an abnormality in the ink jet head, for example.

Returning to the description of FIG. 2, the service providing server 1 includes a providing server communication section 11. The providing server communication section 11 corresponds to an example of a receiving section.

The providing server communication section 11 includes communication hardware that conforms to a predetermined communication standard, and under the control of the providing server control section 10, communicates with a device connected to the global network GN according to the predetermined communication standard. The devices connected to the global network GN here include the card management server 2, the POS terminal 5, the delivery server 6, the service printer 7, and the user terminal 8.

The card management server 2 includes a management server control section 20.

The management server control section 20 includes a processor 200 that executes programs of a CPU or an MPU, and a management server storage section 210, and controls each section of the card management server 2. The management server control section 20 executes various kinds of processing by cooperation of hardware and software so that the processor 200 reads a control program 211 stored in the management server storage section 210 and executes processing.

The management server storage section 210 has a storage area for storing a program executed by the processor 200 or data processed by the processor 200. The management server storage section 210 stores a control program 211 executed by the processor 200 and setting data 212 including various setting values related to an operation of the card management server 2. The management server storage section 210 has a non-volatile storage area for storing programs or data in a non-volatile manner. Further, the management server storage section 210 may include a volatile storage area and may be configured to temporarily store a program executed by the processor 200 or data to be processed.

The management server storage section 210 stores a card management database 213 in addition to the control program 211 and the setting data 212.

The card management database 213 is a database for managing the validity/invalidity of the use of the service card 3.

Figure 5:
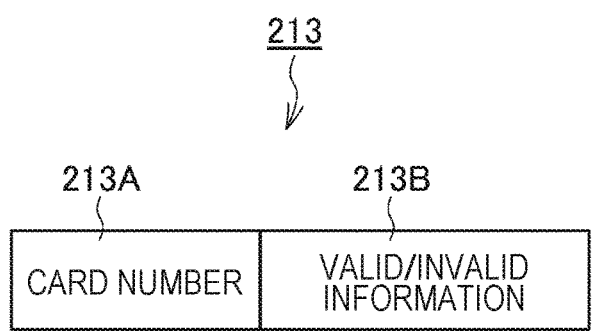
FIG. 5 is a diagram illustrating an example of a card management database.

FIG. 5 is a diagram schematically illustrating information included in one record of the card management database 213.

As illustrated in FIG. 5, one record of the card management database 213 has a card number 213A and valid/invalid information 213B. The card number 213A corresponds to an example of card information.

The card number 213A is identification information that is uniquely assigned to the service card 3 and used for identifying the service card 3. The card number 213A is assigned when the service card 3 is issued. The card number 213A is recorded on the service card in a predetermined form of coding or scratch printing.

The valid/invalid information 213B is information indicating whether the use of the service card 3 is valid or invalid. When valid/invalid information 213B indicating a validity is associated with the card number 213A, the user Uz can receive a printer use service by the service card 3 in which the card number 213A is recorded. On the other hand, when valid/invalid information 213B indicating an invalidity is associated with the card number 213A, the user Uz cannot receive a printer use service by the service card 3 in which the card number 213A is recorded.

Returning to the description of FIG. 2, the card management server 2 includes a management server communication section 21.

The management server communication section 21 includes communication hardware that conforms to a predetermined communication standard, and under the control of the management server control section 20, communicates with a device connected to the global network GN according to the predetermined communication standard. In the present embodiment, the devices that are connected to the global network GN and communicate with the management server communication section 21 are the service providing server 1 and the POS terminal 5.

The delivery server 6 includes a delivery server control section 60.

The delivery server control section 60 includes a processor 600 that executes programs of a CPU or an MPU, and a delivery server storage section 610, and controls each section of the delivery server 6. The delivery server control section 60 executes various kinds of processing by cooperation of hardware and software so that the processor 600 reads a control program 611 stored in the delivery server storage section 610 and executes processing.

The delivery server storage section 610 has a storage area for storing a program executed by the processor 600 or data processed by the processor 600. The delivery server storage section 610 stores a control program 611 executed by the processor 600 and setting data 612 including various setting values related to an operation of the delivery server 6. The delivery server storage section 610 has a non-volatile storage area for storing programs or data in a non-volatile manner. Further, the delivery server storage section 610 may include a volatile storage area and may be configured to temporarily store a program executed by the processor 600 or data to be processed.

The delivery server 6 includes a delivery server communication section 61.

The delivery server communication section 61 includes communication hardware that conforms to a predetermined communication standard, and under the control of the delivery server control section 60, communicates with a device connected to the global network GN according to the predetermined communication standard. In the present embodiment, a device that is connected to the global network GN and communicates with the delivery server communication section 61 is the service providing server 1.

Next, the functional configurations of the POS terminal 5 and the receipt printer 4 will be described.

Figure 6:
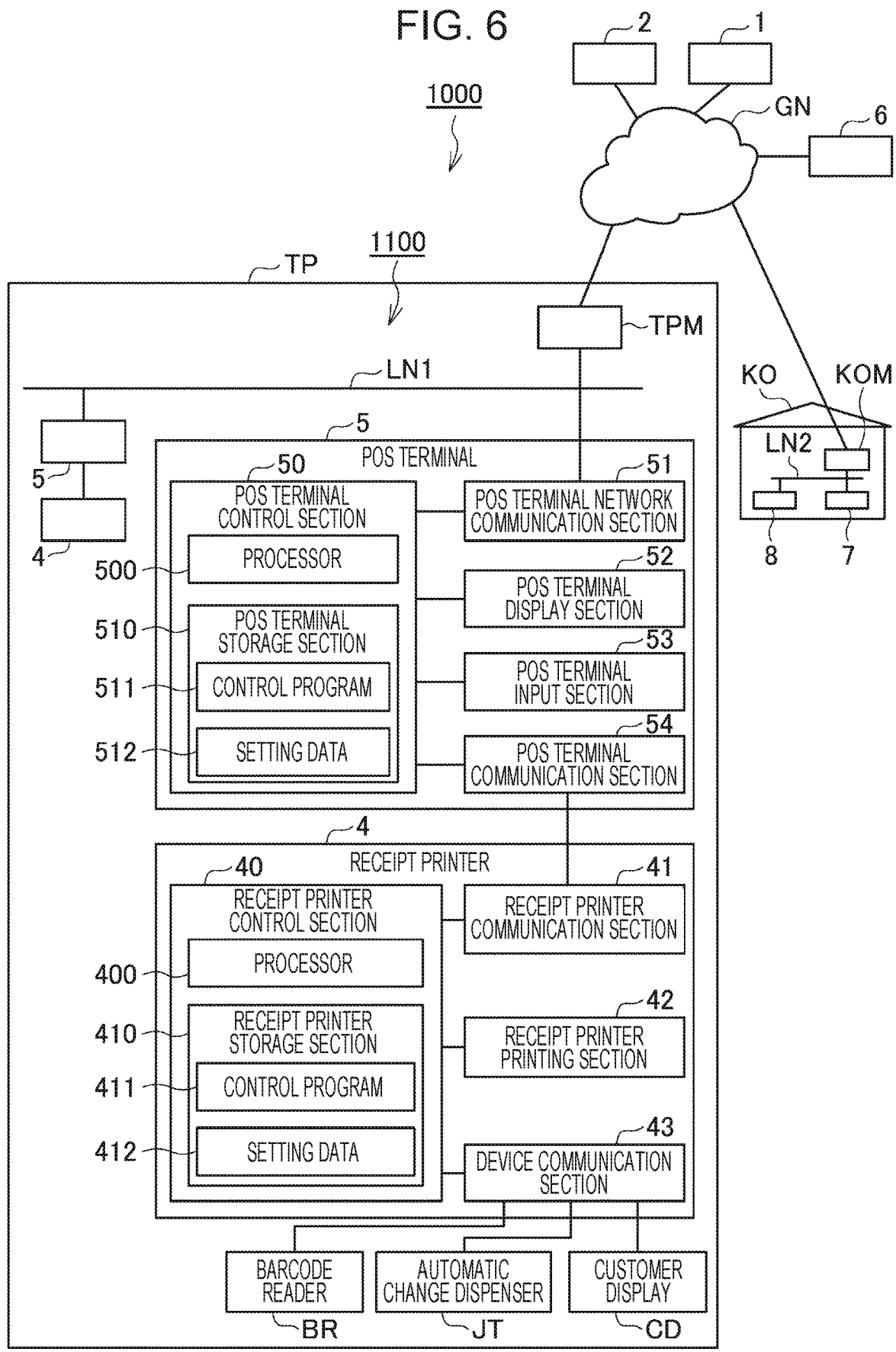
FIG. 6 is a block diagram of a POS terminal and a receipt printer.

FIG. 6 is a block diagram illustrating the functional configurations of the POS terminal 5 and the receipt printer 4. Note that, a case where the service printer 7 is delivered to the house KO according to a delivery instruction from the delivery server 6 is illustrated in FIG. 6.

The POS terminal 5 includes a POS terminal control section 50.

The POS terminal control section 50 includes a processor 500 that executes programs of a CPU or an MPU, and a POS terminal storage section 510, and controls each section of the POS terminal 5. The POS terminal control section 50 executes various kinds of processing by cooperation of hardware and software so that the processor 500 reads the control program 511 stored in the POS terminal storage section 510 and executes processing.

The POS terminal storage section 510 has a storage area for storing a program executed by the processor 500 or data processed by the processor 500. The POS terminal storage section 510 stores a control program 511 executed by the processor 500 and setting data 512 including various setting values related to an operation of the POS terminal 5. The POS terminal storage section 510 has a non-volatile storage area for storing programs or data in a non-volatile manner. Further, the POS terminal storage section 510 may include a volatile storage area and may be configured to temporarily store a program executed by the processor 500 or data to be processed.

The POS terminal 5 includes a POS terminal network communication section 51.

The POS terminal network communication section 51 includes communication hardware that conforms to a predetermined communication standard, and under the control of the POS terminal control section 50, communicates with a device connected to the global network GN according to the predetermined communication standard. In the present embodiment, the device connected to the global network GN and communicates with the POS terminal network communication section 51 is the card management server 2.

The POS terminal 5 includes a POS terminal display section 52.

The POS terminal display section 52 includes a display panel such as a liquid crystal display panel and displays various kinds of information under the control of the POS terminal control section 50.

The POS terminal 5 includes a POS terminal input section 53.

The POS terminal input section 53 includes an operation switch provided on the POS terminal 5 and input means such as a touch panel, detects an operation of the user operating the POS terminal 5 with respect to the input means, and outputs the operation to the POS terminal control section 50. The POS terminal control section 50 executes processing corresponding to the operation with respect to the input means based on the input from the POS terminal input section 53.

The POS terminal 5 includes a POS terminal communication section 54.

The POS terminal communication section 54 is configured by communication hardware that conforms to a predetermined communication standard, and communicates with the receipt printer 4 under the control of the POS terminal control section 50. The communication standard between the POS terminal 5 and the receipt printer 4 may be a wireless communication standard or a wired communication standard.

The receipt printer 4 includes a receipt printer control section 40.

The receipt printer control section 40 includes a processor 400 that executes programs of a CPU or an MPU, and a receipt printer storage section 410, and controls each section of the receipt printer 4. The receipt printer control section 40 executes various kinds of processing by cooperation of hardware and software so that the processor 400 reads the control program 411 stored in the receipt printer storage section 410 and executes processing.

The receipt printer storage section 410 has a storage area for storing a program executed by the processor 400 or data processed by the processor 400. The receipt printer storage section 410 stores a control program 411 executed by the processor 400 and setting data 412 including various setting values related to an operation of the receipt printer 4. The receipt printer storage section 410 has a non-volatile storage area for storing programs or data in a non-volatile manner. Further, the receipt printer storage section 410 may include a volatile storage area and may be configured to temporarily store a program executed by the processor 400 or data to be processed.

The receipt printer 4 includes a receipt printer communication section 41.

The receipt printer communication section 41 is configured by communication hardware that conforms to a predetermined communication standard, and communicates with the POS terminal 5 under the control of the receipt printer control section 40.

The receipt printer 4 includes a receipt printer printing section 42.

The receipt printer printing section 42 includes a transport mechanism including a transport roller that transports roll paper accommodated in a housing of the receipt printer 4, a printing mechanism that prints an image by forming dots on the roll paper by a thermal head, and various mechanisms related to printing on the roll paper, such as a cutting mechanism including a cutter that cuts the roll paper at a predetermined position. Under the control of the receipt printer control section 40, the receipt printer printing section 42 transports the roll paper by the transport mechanism, prints the image of the receipt on the roll paper by the printing mechanism, and cuts the roll paper at a predetermined position by the cutting mechanism, thereby issuing a receipt.

The receipt printer 4 includes a device communication section 43.

The device communication section 43 includes an interface board having a port conforming to a USB standard, a port conforming to a serial communication standard other than the USB, a port conforming to a parallel communication standard, a port conforming to a communication standard related to a wired LAN, and other ports. The devices can be connected to each port. The device communication section 43 communicates with the device connected to the receipt printer 4 via the port under the control of the receipt printer control section 40. The device communication section 43 may have a wireless communication function to wirelessly communicate with the device.

A barcode reader BR, a customer display CD, and an automatic change dispenser JT are connected to the receipt printer 4 as the devices.

The barcode reader BR reads a barcode attached to a product, packaging of the product, or the like, and outputs read data to the device communication section 43. The device communication section 43 outputs the read data input from the barcode reader BR to the receipt printer control section 40. The receipt printer control section 40 transmits the read data input from the device communication section 43 to the POS terminal 5 via the receipt printer communication section 41.

The customer display CD displays information related to accounting under the control of the receipt printer control section 40. The information displayed on the customer display CD may be visually recognized by the customer performing accounting at the register counter R.

The automatic change dispenser JT includes a money receiving opening for receiving money from the customer and a change discharging opening for discharging the change, and under the control of the receipt printer control section 40, discharges the corresponding change from the change discharging opening when money is input through the money receiving opening.

Next, the functional configurations of the user terminal 8 and the service printer 7 will be described.

Figure 7:
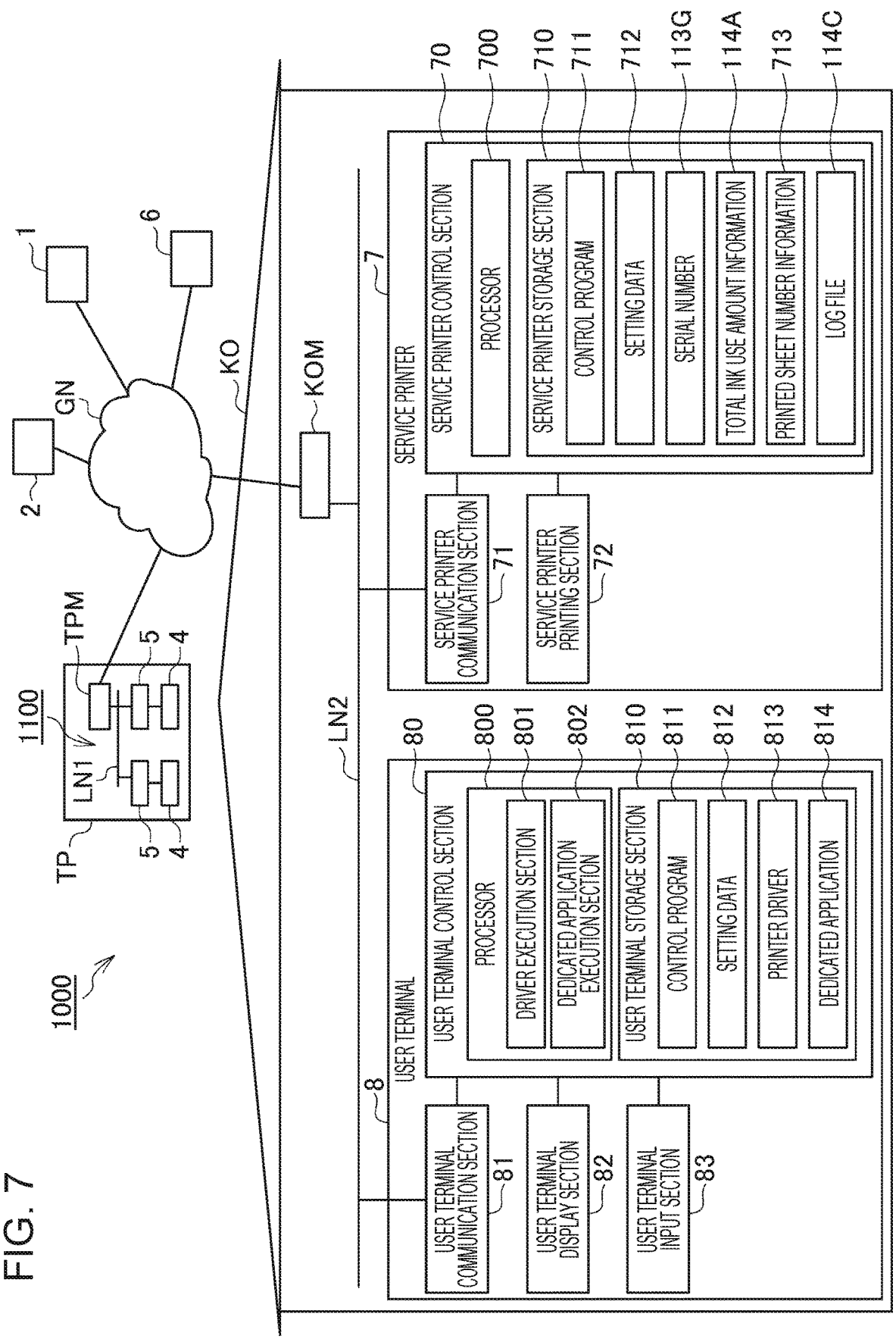
FIG. 7 is a block diagram of a user terminal and a service printer.

FIG. 7 is a block diagram illustrating the functional configurations of the user terminal 8 and the service printer 7. Note that, a case where the service printer 7 is delivered to the house KO according to a delivery instruction from the delivery server 6 is illustrated in FIG. 7.

The user terminal 8 includes a user terminal control section 80.

The user terminal control section 80 includes a processor 800 that executes programs of a CPU or an MPU, and a user terminal storage section 810, and controls each section of the user terminal 8. The user terminal control section 80 executes various kinds of processing by cooperation of hardware and software so that the processor 800 reads the control program 811 stored in the user terminal storage section 810 and executes processing.

A printer driver 813 is installed in the user terminal 8 at a predetermined timing. The user terminal control section 80 functions as a driver execution section 801 when the processor 800 reads and executes the printer driver 813.

In addition, a dedicated application 814, which is a dedicated application program for using a printer use service, is installed in the user terminal 8. The user terminal control section 80 functions as a dedicated application execution section 802 when the processor 800 reads and executes the dedicated application 814. Functions of the driver execution section 801 and the dedicated application execution section 802 will be described later.

The user terminal storage section 810 has a storage area for storing a program executed by the processor 800 or data processed by the processor 800. The user terminal storage section 810 stores a control program 811 executed by the processor 800, setting data 812 including various setting values related to an operation of the user terminal 8, the printer driver 813, the dedicated application 814, and other various kinds of data. The user terminal storage section 810 has a non-volatile storage area for storing programs or data in a non-volatile manner. Further, the user terminal storage section 810 may include a volatile storage area and may be configured to temporarily store a program executed by the processor 800 or data to be processed.

The user terminal 8 includes a user terminal communication section 81.

The user terminal communication section 81 includes communication hardware that conforms to a predetermined communication standard, and under the control of the user terminal control section 80, communicates with devices connected to the local network LN2 and the global network GN according to the predetermined communication standard. In the present embodiment, the device connected to the local network LN2 and communicates with the user terminal communication section 81 is the service printer 7. Further, in the present embodiment, the device connected to the global network GN and communicates with the user terminal communication section 81 is the service providing server 1.

The user terminal 8 includes a user terminal display section 82.

The user terminal display section 82 includes a display panel, and displays various kinds of information on the display panel under the control of the user terminal control section 80.

The user terminal 8 includes a user terminal input section 83.

The user terminal input section 83 includes a keyboard, a mouse, and other input means, detects a user's operation to the input means, and outputs the operation to the user terminal control section 80. The user terminal control section 80 executes processing corresponding to the user's operation to the input means based on the input from the user terminal input section 83.

As described above, the user terminal control section 80 functions as the driver execution section 801 and the dedicated application execution section 802.

The driver execution section 801 generates print data for causing the service printer 7 to print the image indicated by image data, based on the image data generated by a predetermined application program. The print data includes various control commands corresponding to a command system of the service printer 7. The driver execution section 801 transmits the generated print data to the service printer 7 by the user terminal communication section 81.

The dedicated application execution section 802 executes a use registration of a printer use service and a use registration change of a printer use service.

The dedicated application execution section 802 causes the user terminal display section 82 to display a user interface for performing the use registration of the printer use service. In the following description, the user interface is referred to as a "use registration UI". Various kinds of information can be input to the use registration UI. The dedicated application execution section 802 transmits various kinds of information input to the use registration UI to the service providing server 1 by the user terminal communication section 81.

Further, the dedicated application execution section 802 causes the user terminal display section 82 to display a user interface for changing the use registration of the printer use service. Note that, changing the use registration of the printer use service means changing the content of the record stored in the account management database 113. Various kinds of information can be input to the user interface. The dedicated application execution section 802 transmits various kinds of information input to the user interface to the service providing server 1 by the user terminal communication section 81.

The service printer 7 includes a service printer control section 70.

The service printer control section 70 includes a processor 700 that executes programs of a CPU or an MPU, and a service printer storage section 710, and controls each section of the service printer 7. The service printer control section 70 executes various kinds of processing by cooperation of hardware and software so that the processor 700 reads the control program 711 stored in the service printer storage section 710 and executes processing.

The service printer storage section 710 has a storage area for storing programs executed by the processor 700 or data processed by the processor 700. The service printer storage section 710 stores a control program 711 executed by the processor 700 and setting data 712 including various setting values related to an operation of the service printer 7. The service printer storage section 710 has a non-volatile storage area for storing programs or data in a non-volatile manner. Further, the service printer storage section 710 may include a volatile storage area and may be configured to temporarily store a program executed by the processor 100 or data to be processed.

In addition to the control program 711 and the setting data 712, the service printer storage section 710 stores a serial number 113G, a total ink use amount information 114A, printed sheet number information 713, and the log file 114C.

The service printer control section 70 adds an ink amount used for printing to a total ink use amount indicated by the total ink use amount information 114A stored in the service printer storage section 710 each time printing is executed to calculate a total ink use amount at the end of printing. Then, the service printer control section 70 updates the total ink use amount information 114A stored in the service printer storage section 710 to total ink use amount information 114A indicating the calculated total ink use amount.

The printed sheet number information 713 indicates the number of print media printed by the service printer 7 from the last time the printer information is transmitted to the service providing server 1 to the next time the printer information is transmitted to the service providing server 1. The printer information will be described later. The service printer control section 70 resets the number of printed sheets indicated by the printed sheet number information 713 to 0 when the printer information is transmitted to the service providing server 1. Also, the service printer control section 70 cumulatively counts the number of printed sheets each time printing is executed until the printer information is transmitted, and updates the printed sheet number information 713 stored in the service printer storage section 710 to printed sheet number information 713 indicating the number of printed sheets after counting.

As described above, the log file 114C is a file in which log information is described. The service printer control section 70 monitors whether a printer error has occurred, and records a printer error log which is a monitoring item in the log file 114C based on the monitoring result.

The service printer 7 includes a service printer communication section 71.

The service printer communication section 71 is configured by communication hardware that conforms to a predetermined communication standard, and under the control of the service printer control section 70, communicates with devices connected to the local network LN2 and the global network GN according to the predetermined communication standard. In the present embodiment, the device connected to the local network LN2 and communicates with the service printer communication section 71 is the user terminal 8. Further, in the present embodiment, the device connected to the global network GN and communicates with the service printer communication section 71 is the service providing server 1.

The service printer 7 includes a service printer printing section 72.

The service printer printing section 72 has a printing-related configuration including, for example, an ink jet head that discharges ink onto a print medium to form dots, a carriage that operates the ink jet head in a scanning direction, a carriage drive motor that drives the carriage, a transport unit that transports a print medium, an ink tank that supplies ink to the ink jet head, and the like. The service printer printing section 72 prints an image on a print medium under the control of the service printer control section 70.

Next, an operation of the service providing system 1000 will be described.

First, with reference to FIGS. 8 to 9B, an operation related to the start of use of the printer use service will be described. In the description of the operation of the service providing system 1000 with reference to FIGS. 8 to 9B, a case where the user Uz illustrated in FIG. 1 starts using the printer use service is exemplified.

Figure 8:
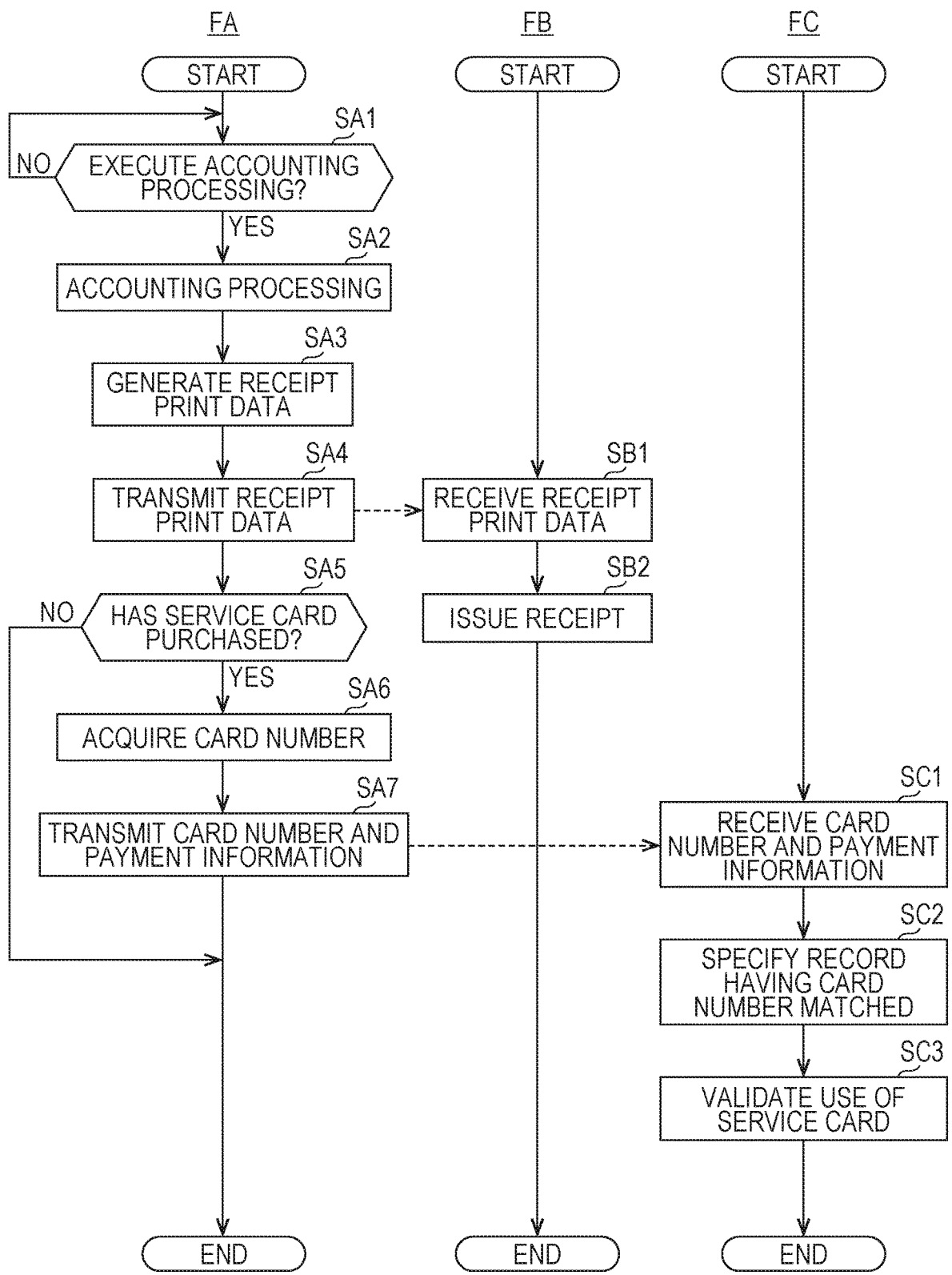
FIG. 8 is a flowchart illustrating an operation of a service providing system.

FIG. 8 is a flowchart illustrating operations of the POS terminal 5, the receipt printer 4, and the card management server 2. In FIG. 8, a flowchart FA illustrates an operation of the POS terminal 5, a flowchart FB illustrates an operation of the receipt printer 4, and a flowchart FC illustrates an operation of the card management server 2.

At the start of the flowchart illustrated in FIG. 8, for a service card 3 that has not been accounted for at the store TP, in the card management database 213, valid/invalid information 213B included in the corresponding record indicates invalid.

The POS terminal control section 50 of the POS terminal 5 determines whether to start accounting processing (step SA1).

For example, when the POS terminal input section 53 detects an operation instructing the execution of the accounting processing, the POS terminal control section 50 makes a positive determination in step SA1. Further, for example, when the POS terminal communication section 54 receives the read data read by the barcode reader BR from the receipt printer 4 after the last accounting processing, the POS terminal control section 50 makes a positive determination in step SA1.

When it is determined to start accounting processing (step SA1: YES), the POS terminal control section 50 executes the accounting processing (step SA2).

In step SA2, the POS terminal control section 50 causes the POS terminal display section 52 to display a user interface that allows input corresponding to the accounting. The POS terminal control section 50 generates payment information related to the payment made in the accounting in response to the input of the person in charge of a cash register with respect to the user interface or the data input from the receipt printer 4 accompanying the accounting of the user Uz. The generated payment information is information indicating a product name purchased by the user Uz in the accounting, the number of purchases of one product, the unit price of one product, the subtotal, the tax, the total, and the like.

Next, when the accounting processing is executed, the POS terminal control section 50 generates receipt print data (step SA3). The receipt print data is data for printing the payment information generated in the accounting processing and instructing the issuance of the receipt. The receipt issuing data includes a plurality of commands according to a command system of the receipt printer 4.

Next, the POS terminal control section 50 transmits the receipt print data generated in step SA3 to the receipt printer 4 by the POS terminal communication section 54 (step SA4).

Referring to the flowchart FB, the receipt printer control section 40 of the receipt printer 4 receives the receipt print data by the receipt printer communication section 41 (step SB1).

Next, the receipt printer control section 40 issues a receipt by the receipt printer printing section 42 based on the receipt print data received in step SB1 (step SB2).

Referring to the flowchart FA, the POS terminal control section 50 of the POS terminal 5 determines whether the user Uz has purchased the service card 3 when the receipt print data is transmitted to the receipt printer 4 by the POS terminal communication section 54 (Step SA5).

For example, in step SA5, the POS terminal control section 50 determines based on whether the product indicated by the payment information generated in the accounting processing includes the service card 3.

Further, for example, in the accounting processing of step SA2, when the read data read by the barcode reader BR and input from the receipt printer 4 includes data indicating the service card 3, the POS terminal control section 50 makes a positive determination in step SA5, and when the read data does not include data indicating the service card 3, the POS terminal control section 50 makes a negative determination in step SA5.

When it is determined that the user Uz has not purchased the service card 3 (step SA5: NO), the POS terminal control section 50 ends the processing.

On the other hand, when it is determined that the user Uz has purchased the service card 3 (step SA5: YES), the POS terminal control section 50 acquires a card number 213A of the service card 3 purchased by the user Uz (step SA6).

For example, for the service card 3 sold at the store TP, it is assumed that the POS terminal 5 stores a combination of the card number 213A and a code indicated by the barcode in a predetermined storage area. In this case, the POS terminal control section 50 acquires the card number 213A corresponding to the code of the service card 3 from the predetermined storage area based on the read data read by the barcode reader BR and input from the receipt printer 4.

Note that, the acquisition method of the card number 213A is merely an example, and the present embodiment is not limited to the acquisition method described above. For example, a configuration is possible in which the card number 213A is visibly recorded on the service card 3, and a QR code including the card number 213A or an IC chip storing the card number 213A is given to each service card 3, and the card number 213A is read from the service card 3 by a reader apparatus provided in the POS terminal 5 or the receipt printer 4. The QR code is a registered trademark.

Then, the POS terminal control section 50 associates the card number 213A acquired in step SA6 with the payment information generated in step SA2, and transmits the card number 213A and the payment information to the card management server 2 by the POS terminal network communication section 51 (step SA7).

Referring to the flowchart FC, the management server control section 20 of the card management server 2 receives the card number 213A and the payment information by the management server communication section 21 (step SC1).

Next, the management server control section 20 specifies a record having a card number 213A that matches the card number 213A received in step SC1 from the card management database 213 (step SC2).

Next, the management server control section 20 sets valid/invalid information 213B included in the record specified in step SC2 to valid/invalid information 213B indicating that it is valid (step SC3). That is, in step SC3, the management server control section 20 validates the use of the service card 3 in which the card number 213A received in step SC1 is recorded.

When the payment information is not associated with the card number 213A, the management server control section 20 does not validate the service card 3. As a result, even when the POS terminal 5 erroneously transmits the card number 213A to the card management server 2 even though the accounting is not performed, the service card 3 is not valid.

As described above, when the user Uz purchases the service card 3 at the store TP, the card management server 2 validates the use of the service card 3 purchased by the user Uz.

Next, an operation of the service providing system 1000 after the user Uz purchases the service card 3 will be described.

FIGS. 9A and 9B are flowcharts illustrating the operations of the user terminal 8, the service providing server 1, the card management server 2, the delivery server 6, and the service printer 7.

In FIGS. 9A and 9B, a flowchart FD illustrates an operation of the user terminal 8, a flowchart FE illustrates an operation of the service providing server 1, a flowchart FF illustrates an operation of the card management server 2, a flowchart FG illustrates an operation of the delivery server 6, and the flowchart FH illustrates an operation of the service printer 7.

With reference to the flowchart FD, the dedicated application execution section 802 of the user terminal control section 80 of the user terminal 8 determines whether to display the use registration UI on the user terminal display section 82 (step SD1). For example, when the user terminal input section 83 detects an operation instructing to display the use registration UI, the dedicated application execution section 802 makes a positive determination in step SD1.

When it is determined that the use registration UI is displayed (step SD1: YES), the dedicated application execution section 802 displays the use registration UI on the user terminal display section 82 (step SD2).

When the use registration UI is displayed, the user Uz inputs various kinds of information to the use registration UI (step SX1).

The information that the user Uz inputs to the use registration UI is a card number 213A recorded on the purchased service card 3, a password 113B set for the account, delivery destination information 113C indicating the delivery destination of the service printer 7 and ink, payment method information 113D indicating the payment method of the price, and plan information 113H indicating the plan of the printer use service. Note that, a plurality of printer use service plans are displayed on the use registration UI, and the user Uz inputs plan information 113H to the use registration UI by selecting one plan on the use registration UI.

The dedicated application execution section 802 determines whether the input to the use registration UI is confirmed (step SD3). The use registration UI is provided with a confirm button for confirming the input, and when the confirm button is operated, the dedicated application execution section 802 makes a positive determination in step SD3.

When it is determined that the input to the use registration UI is confirmed (step SD3: YES), the dedicated application execution section 802 transmits the use registration request information for requesting the use registration of the printer use service to the service providing server 1 by the user terminal communication section 81 (step SD4).

The use registration request information transmitted to the service providing server 1 includes various kinds of information input through the use registration UI. That is, the use registration request information includes the card number 213A, the password 113B, the delivery destination information 113C, the payment method information 113D, and the plan information 113H.

Referring to the flowchart FE, the providing server control section 10 of the service providing server 1 receives the use registration request information by the providing server communication section 11 (step SE1).

Next, the providing server control section 10 executes the authentication processing of the service card 3 in which the card number 213A included in the use registration request information is recorded (step SE2).

In the authentication processing, the providing server control section 10 transmits response request information for inquiring whether the use of the service card 3 in which the card number 213A included in the use registration request information is recorded is valid or invalid to the card management server 2 by the providing server communication section 11 (step SE21). The response request information transmitted in step SE21 includes the card number 213A included in the use registration request information received in step SE1.

With reference to the flowchart FF, the management server control section 20 of the card management server 2 receives the response request information by the management server communication section 21 (step SF1).

Next, the management server control section 20 specifies, from the card management database 213, a record having a card number 213A that matches the card number 213A included in the received response request information (step SF2).

Next, the management server control section 20 transmits valid/invalid information 213B included in the record specified in step SF2 to the service providing server 1 by the management server communication section 21 as a response to the response request information received in step SF1 (step SE3).

When receiving the response request information, in a case in which the management server control section 20 has transmitted valid/invalid information 213B indicating a validity of the card number 213A included in the received response request information to the service providing server 1 once in the past, the valid/invalid information 213B indicating the validity is not transmitted again. As a result, it is possible to prevent a plurality of accounts from being illegally given by the same card number 213A.

Referring to the flowchart FE, the providing server control section 10 of the service providing server 1 receives the valid/invalid information 213B by the providing server communication section 11 in the authentication processing SE2 (step SE22).

Next, the providing server control section 10 determines whether the received valid/invalid information 213B indicates valid or invalid in the authentication processing SE2 (step SE23).

When it is determined that the received valid/invalid information 213B is information indicating an invalidity in the authentication processing SE2 (step SE23: invalid), the providing server control section 10 determines that the authentication of the service card 3 in which the card number 213A included in the use registration request information is recorded has failed (step SE24).

When it is determined that the authentication of the service card 3 in which the card number 213A included in the use registration request information is recorded has failed in the authentication processing SE2, the providing server control section 10 executes processing corresponding to the authentication failure (step SE3). Examples of the corresponding processing include processing of transmitting to the user terminal 8 the fact that the printer use service cannot be received with the service card 3 in which the card number 213A input through the use registration UI is recorded.

When it is determined that the received valid/invalid information 213B is information indicating the validity in the authentication processing SE2 (step SE23: valid), the providing server control section 10 determines that the authentication of the service card 3 in which the card number 213A included in the use registration request information is recorded is successful (step SE25).

Next, when it is determined that the authentication of the service card 3 in which the card number 213A included in the use registration request information is recorded in the authentication processing SE2 is successful, the providing server control section 10 executes account registration processing (step SE4).

In the account registration processing of step SE4, the providing server control section 10 generates an account ID 113A. Further, in the account registration processing, the providing server control section 10 determines the service printer 7 to be used by the user Uz by a predetermined method, and acquires a serial number 113G of the determined service printer 7 by a predetermined method.

Next, in the account registration processing, the providing server control section 10 generates a record having the generated account ID 113A, the password 113B included in the use registration request information received in step SE1, the delivery destination information 113C, payment method information 113D, the plan information 113H, the payment date information 113E, the payment status information 113F, and the acquired serial number 113G. Note that, the payment date information 113E included in the record generated here is not set, and the payment date information 113E is set in step SE9 described later.

Further, the payment status information 113F included in the record generated here is information indicating that payment has been completed. The providing server control section 10 stores the generated record in the account management database 113. Upon completion of storing the record, the providing server control section 10 ends the account registration processing.

When the account registration processing ends, the providing server control section 10 starts the use of the printer use service by the user Uz.

When the account registration processing is executed, the providing server control section 10 transmits completion notification information indicating that the use registration of the printer use service is completed to the user terminal 8 by the providing server communication section 11 (step SE5). This completion notification information includes the account ID 113A generated in the account registration processing. When the user terminal 8 receives the completion notification information, the user Uz can recognize that the use registration of the printer use service is completed and the user Uz can recognize the account ID for the printer use service.

Next, the providing server control section 10 executes printer delivery processing (step SE6). The printer delivery processing corresponds to an example of first delivery processing. The printer delivery processing is the processing of delivering the service printer 7 to the entity (for example, a distributor) who owns the delivery server 6.

In the printer delivery processing, the providing server control section 10 specifies a record stored in the account management database 113 in the account registration processing of step SE4 (step SE61).

Next, the providing server control section 10 transmits delivery request information indicating a delivery request of the service printer 7 to the delivery server 6 by the providing server communication section 11 (step SE62). The delivery request information transmitted in step SE62 includes the delivery destination information 113C and the serial number 113G included in the record specified in step SE61.

Referring to the flowchart FG, the delivery server control section 60 of the delivery server 6 receives the delivery request information by the delivery server communication section 61 (step SG1).

Next, the delivery server control section 60 performs a delivery instruction for instructing delivery of the service printer 7 having the serial number 113G included in the received delivery request information to the delivery destination indicated by the delivery destination information 113C included in the received delivery request information (step SG2).

For example, in step SG2, the delivery server control section 60 transmits information indicating a delivery instruction to a terminal apparatus possessed by a delivery person who is registered in advance. As a result, the service printer 7 is delivered by the delivery person to the delivery destination input by the user Uz through the use registration UI. In a case of FIG. 1, the service printer 7 is delivered to the house KO.

Referring to the flowchart FH, the service printer control section 70 of the service printer 7 determines whether the service printer 7 is powered on (step SH1).

When it is determined that the service printer 7 is powered on (step SH1: YES), the service printer control section 70 determines whether the service printer 7 is connected to the global network GN by a predetermined method (step SH2).

When it is determined that the service printer 7 is connected to the global network GN (step SH2: YES), the service printer control section 70 transmits use start information indicating that the user Uz has started using the service printer 7 to the service providing server 1 by the service printer communication section 71 (step SH3). The use start information transmitted in step SH3 includes the serial number 113G stored in the service printer storage section 710 of the service printer 7.

With reference to the flowchart FE, the providing server control section 10 receives the use start information by the providing server communication section 11 (step SE7).

Next, the providing server control section 10 specifies, from the account management database 113, a record having a serial number 113G that matches the serial number 113G included in the received use start information (step SE8).

Next, the providing server control section 10 sets payment date information 113E included in the specified record as payment date information 113E indicating the date when the use start information is received (step SE9).

As described above, in the service providing system 1000, when the user Uz inputs the card number 213A recorded on the service card 3 purchased from the store TP into the user terminal 8, the service providing server 1 causes the service printer 7 to be delivered. As a result, the user Uz does not need to select the service printer 7 from various printers or take the purchased service printer 7 home from the store in order to receive the printer use service. Therefore, the user Uz can easily receive the printer use service without trouble.

In addition, since the business model allows the user Uz to receive the printer use service by purchasing the service card 3, it is not necessary to sell and inventory the actual service printer 7 at the store TP. Therefore, in the service providing system 1000, it is possible to relax restrictions on the scale, type, or the like of the store TP that the user Uz goes to, for receiving the printer use service. Therefore, the service providing system 1000 can allow the user Uz to receive the printer use service even though the user Uz does not go to a specific store TP.

Next, the operation of the service providing system 1000 after delivery of the service printer 7 will be described with reference to FIG. 10.

Figure 10:
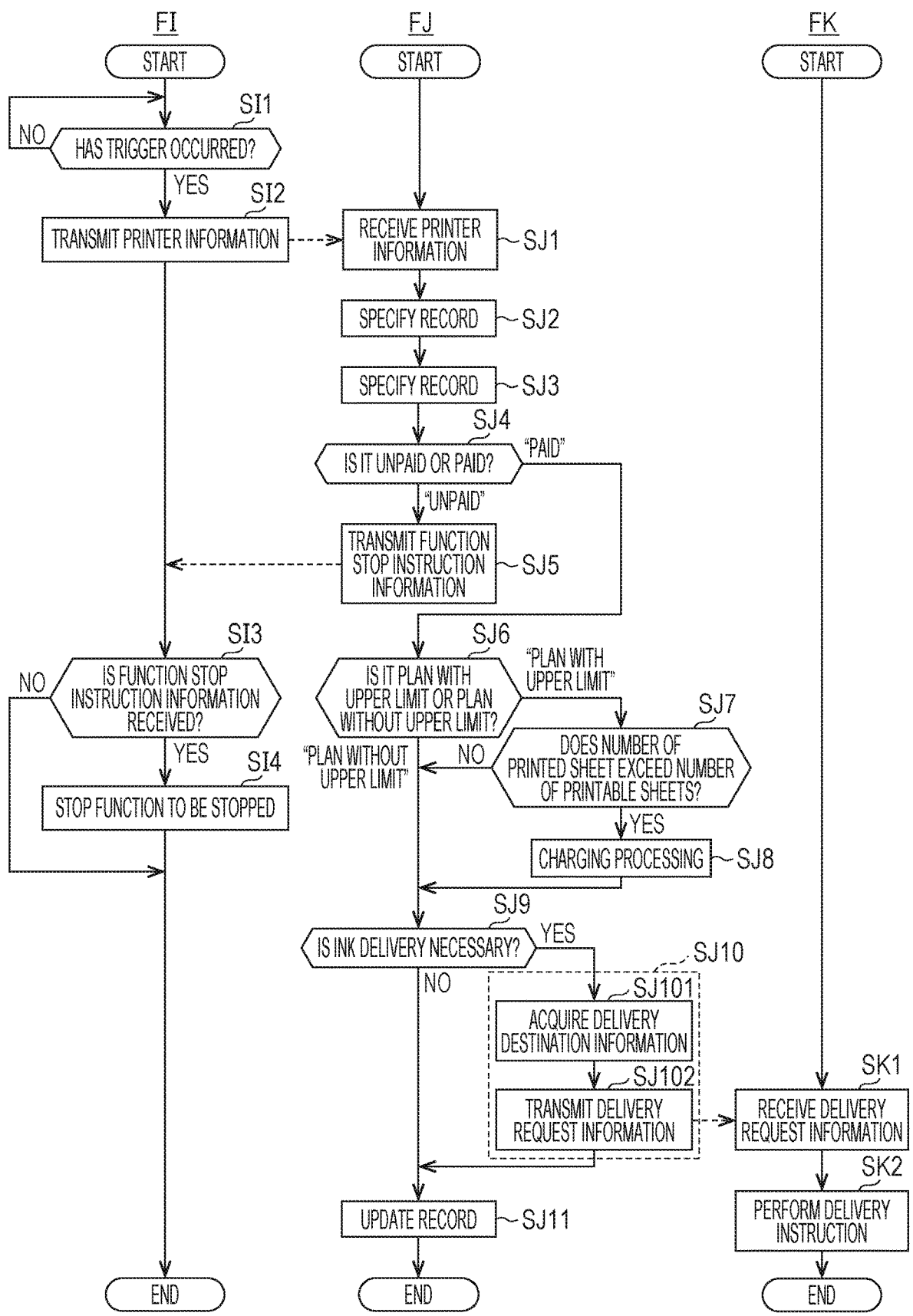
FIG. 10 is a flowchart illustrating an operation of a service providing system.

FIG. 10 is a flowchart illustrating the operations of the service printer 7, the service providing server 1, and the delivery server 6. In FIG. 10, a flowchart FI illustrates an operation of the service printer 7, a flowchart FJ illustrates an operation of the service providing server 1, and a flowchart FK illustrates an operation of the delivery server 6.

Referring to the flowchart FI, the service printer control section 70 of the service printer 7 determines whether a trigger for transmitting printer information has occurred (step SI1).

The printer information is information related to the service printer 7, and includes the serial number 113G, the total ink use amount information 114A, the printed sheet number information 713, and the log file 114C stored in the service printer storage section 710.

For example, when the service printer 7 is powered on, the service printer control section 70 determines that the trigger for transmitting printer information has occurred. Further, for example, when it is determined that a predetermined period for transmitting the printer information has arrived, the service printer control section 70 determines that the trigger for transmitting the printer information has occurred. Further, for example, when the amount of remaining ink in any of the ink tanks is equal to or less than a predetermined amount, the service printer control section 70 determines that the trigger for transmitting printer information has occurred.

The trigger for transmitting the printer information is not limited to these triggers. Further, the trigger for transmitting the printer information is not limited to any of these triggers and may include a plurality of triggers.

When it is determined that the trigger for transmitting the printer information has occurred (step SI1: YES), the service printer control section 70 transmits printer information to the service providing server 1 by the service printer communication section 71 (step SI2).

As described above, the total ink use amount information 114A and the printed sheet number information 713 are updated each time the service printer 7 executes printing. Further, as described above, the service printer control section 70 monitors whether a printer error has occurred, and records a printer error log which is a monitoring item in the log file 114C based on the monitoring result. Therefore, the total ink use amount information 114A, the printed sheet number information 713, and the log file 114C included in the printer information transmitted in step SI2 are the latest information at the time of transmitting the printer information.

Referring to the flowchart FJ, the providing server control section 10 of the service providing server 1 receives the printer information by the providing server communication section 11 (step SJ1).

Next, the providing server control section 10 specifies, from the account management database 113, a record having a serial number 113G that matches the serial number 113G included in the received printer information (step SJ2).

Next, the providing server control section 10 specifies, from the printer management database 114, a record having a serial number 113G that matches the serial number 113G included in the received printer information (step SJ3).

Next, the providing server control section 10 determines whether the payment status information 113F included in the record specified in step SJ2 indicates unpaid or paid (step SJ4).

When it is determined that the payment status information 113F indicates unpaid (step SJ4: unpaid), the providing server control section 10 transmits function stop instruction information, which is information for instructing a function stop, to the service printer 7 by the providing server communication section 11 (Step SJ5).

The function to be stopped indicated by the function stop instruction information transmitted in step SJ5 is, for example, a print function. When the service printer 7 has a scan function or a facsimile function in addition to the print function, the function to be stopped indicated by the function stop instruction information may include these functions.

Referring to the flowchart FI, the service printer control section 70 determines whether the function stop instruction information has been received by the service printer communication section 71 (step SI3).

When it is determined that the function stop instruction information is received (step SI3: YES), the service printer control section 70 stops the function to be stopped indicated by the received function stop instruction information (step SI4).

On the other hand, when it is determined that the function stop instruction information is not received (step SI3: YES), the service printer control section 70 returns the processing to step SI1.

Referring to the flowchart FJ, when it is determined that the payment status information 113F indicates that payment has been made (step SJ4: paid), the providing server control section 10 determines whether the plan indicated by the plan information 113H included in the record specified in step SJ2 is a plan having an upper limit on the number of printed sheets or a plan having no upper limit (step SJ6).

When it is determined that the plan has no upper limit on the number of printed sheets (step SJ6: without upper limit), the providing server control section 10 executes processing of step SJ9.

On the other hand, when it is determined that the plan has an upper limit on the number of printed sheets (step SJ6: with upper limit), the providing server control section 10 executes processing of step SJ7.

In step SJ7, the providing server control section 10 determines whether a sum of a total number of print media indicated by total printed sheet number information 114B included in the record specified in step SJ3 and the number of printed sheets indicated by the printed sheet number information 713 included in the printer information received in step SJ1 exceeds the upper limit of the number of printed sheets that can be printed defined by the plan indicated by the plan information 113H included in the record specified in step SJ2 (step SJ7).

When it is determined that the sum of the number of printed sheets does not exceed the upper limit of the number of printed sheets that can be printed defined by the plan (step SJ7: NO), the providing server control section 10 executes the processing of step SJ9.

On the other hand, when it is determined that the sum of the number of printed sheets exceeds the upper limit of the number of printed sheets that can be printed defined in the plan (step SJ7: YES), the providing server control section 10 executes charging processing (step SJ8). The charging processing is the processing of performing a predetermined setting so that a fee corresponding to the number of printed sheets exceeding the upper limit of the number of print media defined by the plan is charged together with a fee defined by the plan on the next payment date.

The providing server control section 10 shifts the processing to step SJ9 after executing the charging processing. The providing server control section 10 determines in step SJ9 whether ink delivery is necessary (step SJ9).

In step SJ9, the providing server control section 10 determines the total ink use amount based on a plurality of predetermined thresholds different from each other. These thresholds are appropriately determined by prior tests and simulations. In step SJ9, the providing server control section 10 determines whether the total ink use amount indicated by the total ink use amount information 114A received in step SJ1 exceeds a threshold larger than the total ink use amount indicated by the total ink use amount information 114A included in the record specified in step SJ3. The providing server control section 10 makes a positive determination in step SJ9 when it is determined that the total ink use amount exceeds the threshold, and makes a negative determination in step SJ9 when it is determined that the total ink use amount does not exceed the threshold.

When it is determined that ink delivery is not required (step SJ9: NO), the providing server control section 10 executes processing of step SJ11.

On the other hand, when it is determined that ink delivery is required (step SJ9: YES), the providing server control section 10 executes ink delivery processing (step SJ10). The ink delivery processing corresponds to an example of second delivery processing. The ink delivery processing is the processing of delivering ink supplied to the ink tank of the service printer 7 to the entity who owns the delivery server 6.

In the ink delivery processing, the providing server control section 10 acquires the delivery destination information 113C from the record specified in step SJ2 (step SJ101).

Next, the providing server control section 10 transmits a delivery request information indicating an ink delivery request to the delivery server 6 by the providing server communication section 11 (step SJ102). The delivery request information transmitted in step SJ102 includes the delivery destination information 113C acquired in step SJ101.

Referring to the flowchart FK, the delivery server control section 60 of the delivery server 6 receives the delivery request information by the delivery server communication section 61 (step SK1).

Next, the delivery server control section 60 performs a delivery instruction for instructing delivery of the ink to the delivery destination indicated by the delivery destination information 113C included in the received delivery request information (step SK2). For example, in step SK2, the delivery server control section 60 transmits information indicating a delivery instruction to a terminal apparatus possessed by a delivery person who is registered in advance. As a result, ink is delivered to the house KO to which the service printer 7 has been delivered. The ink is delivered by being stored in a container such as an ink bottle.

With reference to the flowchart FJ, the providing server control section 10 updates the record specified in step SJ3 based on the total ink use amount information 114A, the printed sheet number information 713, and the log file 114C included in the received printer information (Step SJ11).

In step SJ11, the providing server control section 10 updates total ink use amount information 114A included in the record specified in step SJ3 to the total ink use amount information 114A included in the received printer information.

Further, in step SJ11, the providing server control section 10 adds the number of printed sheets indicated by the printed sheet number information 713 included in the received printer information to the total number of sheets indicated by the printed sheet number information 713 included in the record specified in step SJ3 to update the printed sheet number information 713 included in the record specified in step SJ3.

Further, in step SJ11, the providing server control section 10 updates the log file 114C included in the record specified in step SJ3 to the log file 114C included in the received printer information.

As described above, the service providing system 1000 includes the service providing server 1 that provides the printer use service, and the user terminal 8 that can communicate with the service providing server 1. The user terminal 8 receives the input of the card number 213A recorded on the service card 3, and transmits the received card number 213A to the service providing server 1. The service providing server 1 performs the authentication processing of the service card 3 based on the card number 213A received from the user terminal 8, and performs printer delivery processing of delivering the service printer 7 when the authentication of the service card 3 in the authentication processing is successful.

Further, in the control method of the service providing system 1000, the user terminal 8 receives the input of the card number 213A recorded on the service card 3 and transmits the received card number 213A to the service providing server 1. The service providing server 1 performs the authentication processing of the service card 3 based on the card number 213A received from the user terminal 8 and performs printer delivery processing of delivering the service printer 7 when the authentication of the service card 3 in the authentication processing is successful.

Further, the service providing server 1 includes the providing server communication section 11 that receives the card number 213A recorded on the service card 3 from the user terminal 8 and a providing server control section 10 that performs authentication processing of the service card 3 based on the card number 213A received by the providing server communication section 11 from the user terminal 8 and printer delivery processing of delivering the service printer when the authentication of the service card 3 in the authentication processing is successful.

According to the service providing system 1000, the control method of the service providing system 1000, and the service providing server 1, the user Uz can receive the printer use service by inputting the card number 213A recorded on the service card 3 into the user terminal 8. Therefore, the user Uz does not need to, for example, select a printer to be used in the printer use service from various printers or take the purchased service printer 7 home from the store in order to receive the printer use service. Therefore, the user Uz can receive the printer use service without trouble.

The user terminal 8 receives the input of the delivery destination information 113C indicating the delivery destination of the service printer 7, and transmits the received delivery destination information 113C to the service providing server 1. In the printer delivery processing, the service providing server 1 causes the service printer 7 to be delivered to the delivery destination indicated by the delivery destination information 113C received from the user terminal 8.

As a result, the service printer 7 can be delivered to the delivery destination designated by the user Uz, and the labor required for receiving the printer use service can be further reduced.

The printer use service includes delivery of ink for the service printer 7. The service providing server 1 receives the total ink use amount information 114A from the service printer 7 delivered in the printer delivery processing, and determines whether ink delivery is required based on the received total ink use amount information 114A. Then, the service providing server 1 performs the ink delivery processing when it is determined that the ink delivery is required.

As a result, since ink is delivered, the user Uz does not have to take the trouble of purchasing the ink consumed by the service printer 7 from the store TP or the like. Therefore, the user Uz can use the service printer 7 in the printer use service without trouble.

The service providing system 1000 includes a POS terminal 5 that performs accounting processing for the service card 3, and a card management server 2 that can communicate with the POS terminal 5 and that validates or invalidates the use of the service card 3. The POS terminal 5 transmits the card number 213A recorded on the accounted service card 3 to the card management server 2. The card management server 2 receives the card number 213A from the POS terminal 5 and validates the use of the service card 3 in which the received card number 213A is recorded. When the use of the service card 3 in which the card number 213A received from the user terminal 8 is recorded is valid, the service providing server 1 determines that the authentication of the service card 3 in the authentication processing is successful.

As a result, the service card 3 that allows the printer use service can be limited to the accounted service card 3. Therefore, the service providing system 1000 can prevent the printer use service from being used by an illegally obtained service card 3.

The POS terminal 5 transmits the payment information of the service card 3 generated in the accounting processing of the service card 3 to the card management server 2 in association with the card number 213A. When the payment information is associated with the received card number 213A, the card management server 2 validates the use of the service card 3 in which the received card number 213A is recorded.

As a result, the service card 3 that allows the printer use service can be reliably limited to the accounted service card 3. Therefore, the service providing system 1000 can reliably prevent the printer use service from being used by an illegally obtained service card 3.

The above-described embodiment merely illustrates a form of the present disclosure, and may be optionally modified and applied within the scope of the present disclosure.

For example, in the above-described embodiment, the receipt printer 4 of which printing method is a thermal type is exemplified, but the printing method of the receipt printer 4 is not limited to the thermal type and may be another printing method such as an ink jet type.

For example, in the above-described embodiment, a serial ink jet printer is exemplified as the service printer 7, but the service printer 7 may be a line-type ink jet printer.

For example, in the above-described embodiment, ink is exemplified as a consumable item for the service printer 7, and a case where the ink is delivered is exemplified. However, the consumable item to be delivered is not limited to ink, and may include, for example, a waste liquid box that stores ink that is discharged as waste liquid during maintenance of the ink jet head. In this case, the service printer 7 transmits information indicating the amount of ink stored in the waste liquid box to the service providing server 1 as consumable item-related information. Then, the service providing server 1 gives the delivery server 6 a delivery instruction for causing the waste liquid box to be delivered based on the information received from the service printer 7. Further, when the service printer 7 is an electrophotographic printer, toner may be a consumable item.

For example, the functions of the providing server control section 10, the management server control section 20, the receipt printer control section 40, the POS terminal control section 50, the delivery server control section 60, the service printer control section 70, and the user terminal control section 80 may be realized by a plurality of processors or semiconductor chips.

In addition, each section illustrated in FIGS. 2, 6, and 7 is an example, and a specific mounting form is not particularly limited. In other words, it is not always necessary to individually mount hardware corresponding to each section, and it is of course possible to implement a function of each section by executing a program by one processor. Further, in the above-described embodiment, a portion of the functions realized by software may be realized by hardware, or a portion of the functions realized by hardware may be realized by software. In addition, the specific detailed configurations of other sections of the service providing system 1000 may be optionally changed without departing from the spirit of the present disclosure.

Further, for example, step units of the operation illustrated in FIGS. 8, 9A, 9B, and 10 are divided according to the main processing content in order to facilitate understanding of the operation of each apparatus of the service providing system 1000. Therefore, the present disclosure is not limited by the division method or name of the processing unit. The step unit may be divided into a larger number of steps according to the processing content. Further, one step unit may be divided so as to include more processing. Further, the order of the steps may be appropriately changed within a range that does not interfere with the spirit of the present disclosure.

What is claimed is:

1. A service providing system comprising:
   a first information processing apparatus configured to provide a service related to a use of a printer; and
   a first terminal apparatus configured to communicate with the first information processing apparatus, wherein
   the first terminal apparatus is configured to receive an input of card information recorded in a service card which indicates a purchase of the service, and the card information is identification information uniquely assigned to the service card and the first terminal apparatus transmits the received card information to the first information processing apparatus, and
   the first information processing apparatus is configured to perform authentication processing of the card based on the card information received from the first terminal apparatus and when authentication of the card in the authentication processing is successful then the first information processing apparatus is configured to perform first delivery processing of causing the printer used in the service to be delivered.

2. The service providing system according to claim 1, wherein
the first terminal apparatus is configured to receive an input of delivery destination information indicating a delivery destination of the printer and transmits the received delivery destination information to the first information processing apparatus, and
the first information processing apparatus is configured to cause the printer to be delivered to the delivery destination indicated by the delivery destination information received from the first terminal apparatus in the first delivery processing.

3. The service providing system according to claim 1, wherein
the service includes delivery of a consumable item for the printer, and
the first information processing apparatus is configured to receive consumable item-related information related to the consumable item from the printer delivered in the first delivery processing, determines whether the consumable item needs to be delivered based on the received consumable item-related information, and performs second delivery processing of causing the consumable item to be delivered when it is determined that the consumable item needs to be delivered.

4. The service providing system according to claim 1, further comprising:
a second terminal apparatus configured to performing accounting processing of the card; and
a second information processing apparatus configured to communicate with the second terminal apparatus and validate or invalidate a use of the card, wherein
the second terminal apparatus is configured to transmit the card information recorded in the card subjected to the accounting processing to the second information processing apparatus,
the second information processing apparatus is configured to receive the card information from the second terminal apparatus and validates the use of the card in which the received card information is recorded, and
when the use of the card in which the card information received from the first terminal apparatus is recorded is valid, the first information processing apparatus determines that the authentication of the card in the authentication processing is successful.

5. The service providing system according to claim 4, wherein
the second terminal apparatus is configured to transmit payment information of the card generated in the accounting processing of the card to the second information processing apparatus in association with the card information, and
the second information processing apparatus is configured to validate the use of the card in which the received card information is recorded when the payment information is associated with the received card information.

6. A control method of a service providing system, the system including
a first information processing apparatus providing a service related to a use of a printer, and a first terminal apparatus configured to communicate with the first information processing apparatus, the method comprising:
receiving, by the first terminal apparatus, an input of card information recorded in a service card that indicates a purchase of a service, and the card information is identification information uniquely assigned to the service card;
transmitting, by the first terminal apparatus, the received card information to the first information processing apparatus;
performing, by the first information processing apparatus, authentication processing of the card based on the card information received from the first terminal apparatus; and
performing, by the first information processing apparatus, first delivery processing of causing the printer used in the service to be delivered when authentication of the card in the authentication processing is successful, by the first information processing apparatus.

7. An information processing apparatus that provides a service related to a use of a printer, the apparatus comprising:
a receiving section that is configured to receive from a terminal apparatus card information recorded in a service card that indicates a purchase of a service and the card information includes identification information which is uniquely assigned to the service card; and
a control section that is configured to perform authentication processing of the card based on the card information received by the receiving section from the terminal apparatus and performs first delivery processing of causing the printer used in the service to be delivered when authentication of the card in the authentication processing is successful.

8. A service providing system comprising:
a first information processing apparatus configured to provide a service related to a use of a printer; and
a first terminal apparatus configured to communicate with the first information processing apparatus, wherein
the first terminal apparatus is configured to receive an input of card information recorded in a service card which indicates a purchase of the service, and the card information is identification information uniquely assigned to the service card and the first terminal apparatus transmits the received card information to the first information processing apparatus,
the first information processing apparatus is configured to perform authentication processing of the card based on the card information received from the first terminal apparatus and the first information processing apparatus determines that the authentication if the card is successful by determining whether the card information was previously validated for use by a second information processing apparatus, and
when authentication of the card in the authentication processing is successful then the first information processing apparatus is configured to perform first delivery processing of causing the printer used in the service to be delivered.

9. A control method of a service providing system, the system including
a first information processing apparatus providing a service related to a use of a printer, and a first terminal apparatus configured to communicate with the first information processing apparatus, the method comprising:

receiving, by the first terminal apparatus, an input of card information recorded in a service card that indicates a purchase of a service, and the card information is identification information uniquely assigned to the service card;

transmitting, by the first terminal apparatus, the received card information to the first information processing apparatus;

performing, by the first information processing apparatus, authentication processing of the card based on the card information received from the first terminal apparatus and the first information processing apparatus determines that the authentication if the card is successful by determining whether the card information was previously validated for use by a second information processing apparatus, and; and performing, by the first information processing apparatus, first delivery processing of causing the printer used in the service to be delivered when authentication of the card in the authentication processing is successful, by the first information processing apparatus.

* * * * *